(12) United States Patent
Rahman

(10) Patent No.: US 12,302,287 B2
(45) Date of Patent: May 13, 2025

(54) METHOD TO COMMUNICATE SERVICE TYPE IN A PAGING MESSAGE FOR 4G/5G CELLULAR COMMUNICATION

(71) Applicant: T-MOBILE INNOVATIONS LLC, Overland Park, KS (US)

(72) Inventor: Muhammad Tawhidur Rahman, Sammamish, WA (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 359 days.

(21) Appl. No.: 17/689,381

(22) Filed: Mar. 8, 2022

(65) Prior Publication Data

US 2023/0292284 A1 Sep. 14, 2023

(51) Int. Cl.
*H04W 68/02* (2009.01)
*H04W 72/563* (2023.01)
*H04W 84/04* (2009.01)

(52) U.S. Cl.
CPC ......... *H04W 68/02* (2013.01); *H04W 72/563* (2023.01); *H04W 84/042* (2013.01)

(58) Field of Classification Search
CPC . H04W 68/02; H04W 72/563; H04W 84/042; H04W 68/005
USPC ....................................................... 455/458
See application file for complete search history.

(56) References Cited

U.S. PATENT DOCUMENTS

| 10,887,938 | B1* | 1/2021 | Youtz | H04W 36/0027 |
| 2013/0012243 | A1* | 1/2013 | Nishida | H04L 65/1104 |
| | | | | 455/458 |
| 2014/0140282 | A1* | 5/2014 | Zhou | H04W 76/10 |
| | | | | 370/328 |
| 2016/0345210 | A1* | 11/2016 | Shan | H04W 8/04 |
| 2019/0327709 | A1* | 10/2019 | Li | H04W 76/11 |
| 2022/0061021 | A1* | 2/2022 | Wang | H04L 1/0061 |
| 2023/0269701 | A1* | 8/2023 | Hong | H04W 68/005 |
| | | | | 455/458 |
| 2023/0300722 | A1* | 9/2023 | Hong | H04W 48/12 |
| | | | | 455/458 |

* cited by examiner

*Primary Examiner* — Don N Vo
(74) *Attorney, Agent, or Firm* — SHOOK, HARDY & BACON L.L.P.; Elena K. McFarland

(57) ABSTRACT

Systems and methods are provided for communicating service type in a paging message for cellular communication (e.g., 4G, 5G). This enables the radio network and user equipment (UE) to be aware of the paging service type and prioritize the most critical signaling events. Initially, a service indication flag is received from one or more of: a radio resource control message from a UE of the one or more UEs; a S1-AP message from a Mobile Management Entity; or a Next Generation Application Protocol message from an Access and Mobility Management Function. Based on the service indication flag, a service type of a terminating service that is causing the UE to be paged is determined. Based on the determined service type, resources can be allocated for the UE.

18 Claims, 4 Drawing Sheets

300

302 — RECEIVE, AT A NODE CONFIGURED TO WIRELESSLY COMMUNICATE WITH ONE OR MORE UEs, A SERVICE INDICATION FLAG IN A RADIO RESOURCE CONTROL (RRC) MESSAGE FROM A UE OF THE ONE OR MORE UEs

304 — BASED ON THE SERVICE INDICATION FLAG, DETERMINE, AT THE NODE, A SERVICE TYPE OF TERMINATING SERVICE THAT IS CAUSING THE UE TO BE PAGED

METHOD TO COMMUNICATE SERVICE TYPE IN A PAGING MESSAGE FOR 4G/5G CELLULAR COMMUNICATION

SUMMARY

A high-level overview of various aspects of the present technology is provided in this section to introduce a selection of concepts that are further described below in the detailed description section of this disclosure. This summary is not intended to identify key or essential features of the claimed subject matter, nor is it intended to be used as an aid in isolation to determine the scope of the claimed subject matter.

In aspects set forth herein, systems and methods are provided for communicating service type in a paging message for cellular communication (e.g., 4G, 5G). More particularly, in aspects set forth herein, systems and methods enable the radio network and user equipment (UE) to be aware of the paging service type. As a result, the radio network and the UE are able to prioritize the most critical signaling events. Initially, a service indication flag is received from one or more of: a radio resource control (RRC) message from a UE of the one or more UEs; a S1-AP message from a Mobile Management Entity (MME); or a Next Generation Application Protocol (NGAP) message from an Access and Mobility Management Function (AMF). Based on the service indication flag, a service type of a terminating service that is causing the UE to be paged is determined. Based on the determined service type, resources can be allocated for the UE.

BRIEF DESCRIPTION OF THE SEVERAL VIEWS OF THE DRAWINGS

Implementations of the present disclosure are described in detail below with reference to the attached drawing figures, wherein.

DETAILED DESCRIPTION

Figure 1:
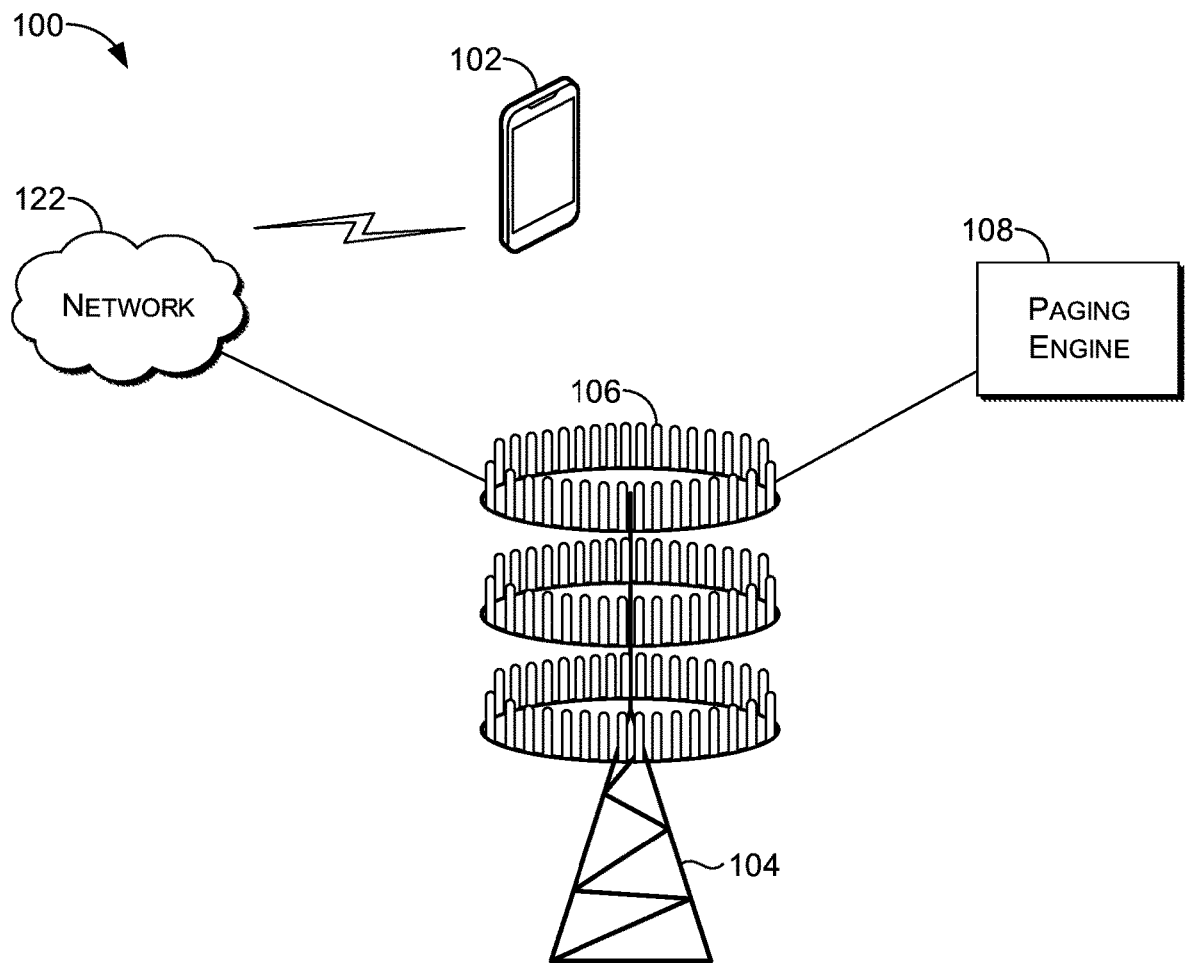
FIG. 1 depicts a diagram of an exemplary network environment in which implementations of the present disclosure may be employed.

The subject matter of embodiments of the invention is described with specificity herein to meet statutory requirements. However, the description itself is not intended to limit the scope of this patent. Rather, the inventors have contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Throughout this disclosure, several acronyms and shorthand notations are employed to aid the understanding of certain concepts pertaining to the associated system and services. These acronyms and shorthand notations are intended to help provide an easy methodology of communicating the ideas expressed herein and are not meant to limit the scope of embodiments described in the present disclosure. The following is a list of these acronyms:

3G Third-Generation Wireless Technology
4G Fourth-Generation Cellular Communication System
5G Fifth-Generation Cellular Communication System
CD-ROM Compact Disk Read Only Memory
CDMA Code Division Multiple Access
eNodeB Evolved Node B
GIS Geographic/Geographical/Geospatial Information System
gNodeB Next Generation Node B
GPRS General Packet Radio Service
GSM Global System for Mobile communications
iDEN Integrated Digital Enhanced Network
DVD Digital Versatile Discs
EEPROM Electrically Erasable Programmable Read Only Memory
LED Light Emitting Diode
LTE Long Term Evolution
MIMO Multiple Input Multiple Output
MD Mobile Device
PC Personal Computer
PCS Personal Communications Service
PDA Personal Digital Assistant
RAM Random Access Memory
RET Remote Electrical Tilt
RF Radio-Frequency
RFI Radio-Frequency Interference
R/N Relay Node
RNR Reverse Noise Rise
ROM Read Only Memory
RSRP Reference Transmission Receive Power
RSRQ Reference Transmission Receive Quality
RSSI Received Transmission Strength Indicator
SINR Transmission-to-Interference-Plus-Noise Ratio
SNR Transmission-to-noise ratio
SON Self-Organizing Networks
TDMA Time Division Multiple Access
TXRU Transceiver (or Transceiver Unit)
UE User Equipment Further, various technical terms are used throughout this description. An illustrative resource that fleshes out various aspects of these terms can be found in Newton's Telecom Dictionary, 25th Edition (2009).

As used herein, the term "node" is used to refer to network access technology, such as eNode, gNode, etc. In other aspects, the term "node" may be used to refer to one or more antennas being used to communicate with a user device.

Embodiments of the present technology may be embodied as, among other things, a method, system, or computer-program product. Accordingly, the embodiments may take the form of a hardware embodiment, or an embodiment combining software and hardware. An embodiment takes the form of a computer-program product that includes computer-useable instructions embodied on one or more computer-readable media.

Computer-readable media include both volatile and nonvolatile media, removable and nonremovable media, and contemplate media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

By way of background, a traditional telecommunications network employs a plurality of base stations (i.e., cell sites, cell towers) to provide network coverage. The base stations are employed to broadcast and transmit transmissions to user devices of the telecommunications network. An access point may be considered to be a portion of a base station that may comprise an antenna, a radio, and/or a controller. In aspects, an access point is defined by its ability to communicate with a user equipment (UE), such as a wireless communication device (WCD), according to a single protocol (e.g., 3G, 4G, LTE, 5G, and the like); however, in other aspects, a single access point may communicate with a UE according to multiple protocols. As used herein, a base station may comprise one access point or more than one access point. Factors that can affect the telecommunications transmission include, e.g., location and size of the base stations, and frequency of the transmission, antenna array configuration corresponding to both the access point and the UE, among other factors. The base stations are employed to broadcast and transmit transmissions to user devices of the telecommunications network.

As employed herein, a UE (also referenced herein as a user device) or WCD can include any device employed by an end-user to communicate with a wireless telecommunications network. A UE can include a mobile device, a mobile broadband adapter, or any other communications device employed to communicate with the wireless telecommunications network. A UE, as one of ordinary skill in the art may appreciate, generally includes one or more antenna coupled to a radio for exchanging (e.g., transmitting and receiving) transmissions with a nearby base station.

In conventional cellular communications technology, when a mobile subscriber needs to receive a terminating call, message, or any data, if his or her UE is not in connected mode, the core network (i.e., the MME for 4G LTE or the AMF for 5G SA) needs to page to find the UE. This paging can occur for any service type. For example, IP Multimedia System (IMS) includes voice call and messaging services. In contrast, data includes scenarios where a mobile user is browsing the internet or using services such as FACEBOOK, NETFLIX, YOUTUBE, CNN, YAHOO, and the like.

In 4G and 5G NSA scenarios, each of the service types, IMS and data, are identified through a unique Access Point Name (APN) within the core network. In a 5G SA scenario, the traffic is characterized as Data Network Name (DNN), which is a similar concept as the APN. Each of these attributes (i.e., the APN and the DNN) are included in the paging flow within core network communications. For example, the core network elements that handle and initiate paging requests for any terminating flow are the MME for 4G and the AMF for 5G. The underlying service type is communicated to the MME and the AMF by the PGW and the SMF, respectively. These communications enable the core network to be aware of the underlying service type causing the UE to be paged.

However, this service indication is not cascaded to the base station (e.g., eNodeB or gNodeB) in conventional systems. Accordingly, the radio network and the UE remains unaware of paging service type. As a result, the based station and/or the UE are unable to make certain choices that could have helped to ensure better a service level.

For example, assume there is an EN-DC leg set up for 5G NSA while there is an incoming terminating voice call for a 5G customer. Ideally, the EN-DC leg would be postponed and a 5G NR leg would be brought onboard in NSA while LTE is already set up as a pre-existing anchor node. However, in conventional systems, the LTE base station (i.e., the eNodeB) would not be able to determine there is an incoming terminating voice call for the 5G customer.

The present disclosure is directed to communicating service type in a paging message for cellular communication (e.g., 4G, 5G). This enables the radio network and UE to be aware of the paging service type and prioritize the most critical signaling events. To do so, a service indication flag is received from one or more of: a radio resource control message from a UE of the one or more UEs; a S1-AP message from a Mobile Management Entity; or a Next Generation Application Protocol message from an Access and Mobility Management Function. Based on the service indication flag, a service type of a terminating service that is causing the UE to be paged is determined. Based on the determined service type, resources can be allocated for the UE.

In this way, and referring back to the example above, it would be appropriate to suspend any EN-DC signaling if a terminating voice call paging is detected. One way this could occur is if the mobile transmission (MT) from the UE is able to reply to the eNodeB that it is being paged for IMS (i.e., a voice call). In this way, the eNodeB can apply a customized treatment based on the service type. In addition to applying a customized treatment based on the service type, customized treatments can also be applied for the paging flow to the UE itself (e.g., based on frequency, time of day, service type, and the like). Moreover, enabling an understanding of the service type by the UE and the base station, customization can be applied to each step of the radio scheduler, resource allocation, prioritization, and processing.

A first aspect of the present disclosure is directed to a method for communicating service type in a paging message for 4G/5G cellular communications. A service indication flag is received, at a node configured to wirelessly communicate with one or more UEs, in a RRC message from a UE of the one or more UEs. Based on the service indication flag, a service type of a terminating service that is causing the UE to be paged is determined at the node.

A second aspect of the present disclosure is directed to a method for communicating service type in a paging message for 4G/5G cellular communications. A service indication flag is received, at a node configured to wirelessly communicate with one or more UEs, in one of: 1) a S1-AP message from a MME; or 2) a NGAP message from an AMF. Based on the service indication flag, a service type of a terminating service that is causing a UE of the one or more UEs to be paged is determined at the node.

Another aspect of the present disclosure is directed to a system for communicating service type in a paging message for 4G/5G cellular communications. The system comprises one or more UEs and a node configured to wirelessly communicate with the one or more UEs. Then node is configured to: 1) receive a service indication flag from one or more of: a) a radio resource control (RRC) message from a UE of the one or more UEs; b) a S1-AP message from a Mobile Management Entity (MME); or c) a Next Generation Application Protocol (NGAP) message from an Access and Mobility Management Function (AMF); 2) based on the service indication flag, determine a service type of a terminating service that is causing the UE to be paged; and 3) based on the determined service type, allocate resources for the UE.

Turning to FIG. 1, a network environment suitable for use in implementing embodiments of the present disclosure is provided. Such a network environment is illustrated and designated generally as network environment 100. Network environment 100 is but one example of a suitable network environment and is not intended to suggest any limitation as to the scope of use or functionality of the disclosure. Neither should the network environment 100 be interpreted as having any dependency or requirement relating to any one or combination of components illustrated.

Figure 6:
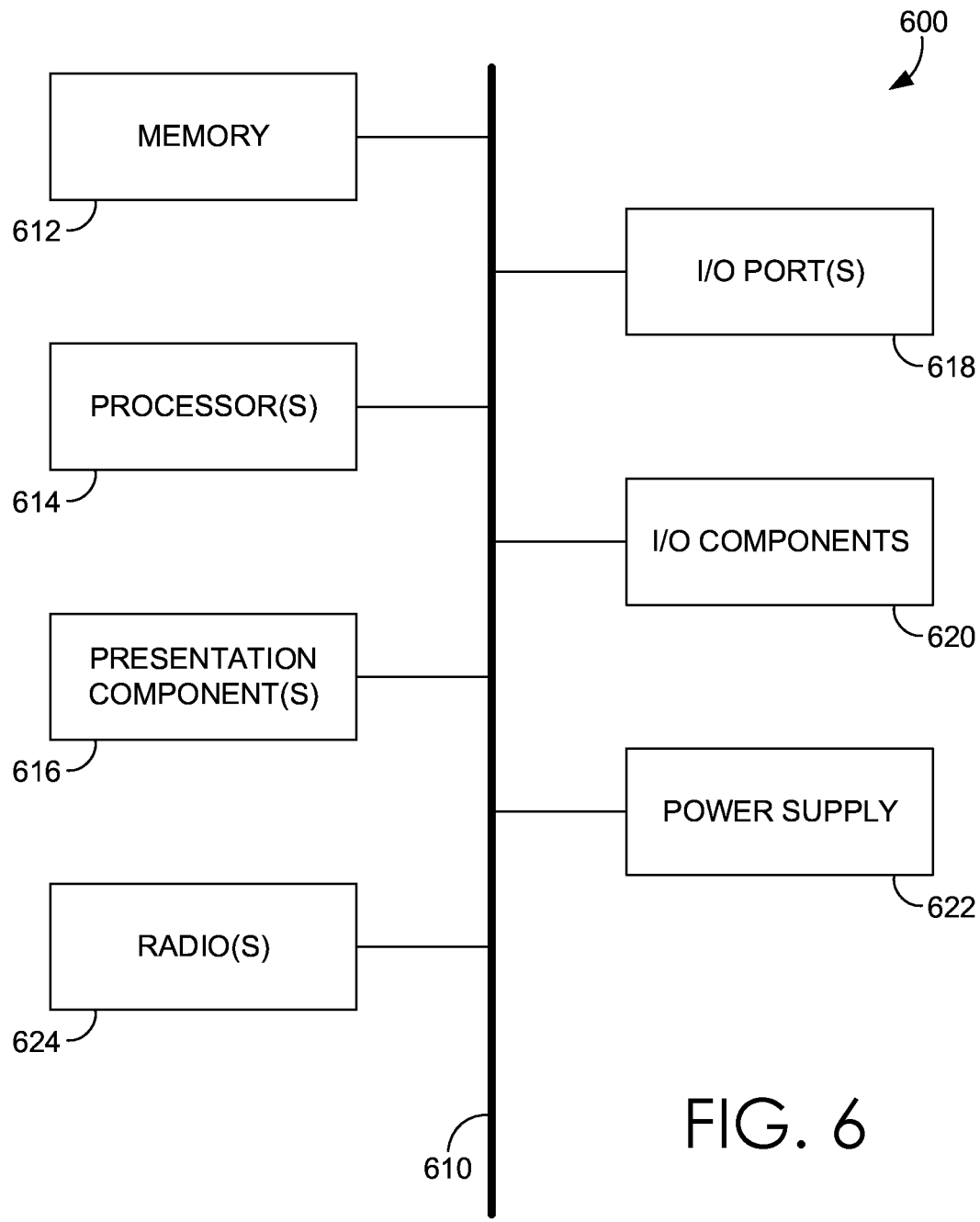
FIG. 6 depicts a diagram of an exemplary computing environment suitable for use in implementations of the present disclosure.

A network cell may comprise a base station to facilitate wireless communication between a communications device within the network cell, such as communications device 600 described with respect to FIG. 6, and a network. As shown in FIG. 1, a communications device may be a UE 102. In the network environment 100, UE 102 may communicate with other devices, such as mobile devices, servers, etc. The UE 102 may take on a variety of forms, such as a personal computer, a laptop computer, a tablet, a netbook, a mobile phone, a Smart phone, a personal digital assistant, or any other device capable of communicating with other devices. For example, the UE 102 may take on any form such as, for example, a mobile device or any other computing device capable of wirelessly communication with the other devices using a network. Makers of illustrative devices include, for example, Research in Motion, Creative Technologies Corp., Samsung, Apple Computer, and the like. A device can include, for example, a display(s), a power source(s) (e.g., a battery), a data store(s), a speaker(s), memory, a buffer(s), and the like. In embodiments, UE 102 comprises a wireless or mobile device with which a wireless telecommunication network(s) can be utilized for communication (e.g., voice and/or data communication). In this regard, the UE 102 can be any mobile computing device that communicates by way of, for example, a 5G network.

The UE 102 may utilize network 122 to communicate with other computing devices (e.g., mobile device(s), a server(s), a personal computer(s), etc.). In embodiments, network 122 is a telecommunications network, or a portion thereof. A telecommunications network might include an array of devices or components, some of which are not shown so as to not obscure more relevant aspects of the invention. Components such as terminals, links, and nodes (as well as other components) may provide connectivity in some embodiments. Network 122 may include multiple networks, as well as being a network of networks, but is shown in more simple form so as to not obscure other aspects of the present disclosure. Network 122 may be part of a telecommunications network that connects subscribers to their immediate service provider. In embodiments, network 122 is associated with a telecommunications provider that provides services to user devices, such as UE 102. For example, network 122 may provide voice services to user devices or corresponding users that are registered or subscribed to utilize the services provided by a telecommunications provider. Although it is contemplated network 122 can be any communication network providing voice and/or data service(s), such as, for example, a 1× circuit voice, a 3G network (e.g., CDMA, CDMA1000, WCDMA, GSM, UMTS), a 4G network (WiMAX, LTE, HSDPA), or the like, network 122 is depicted in FIG. 1 as a 5G network.

The network environment 100 may include a database (not shown). The database may be similar to the memory component 612 in FIG. 6 and can be any type of medium that is capable of storing information. The database can be any collection of records (e.g., network or device information). In one embodiment, the database includes a set of embodied computer-executable instructions that, when executed, facilitate various aspects disclosed herein. These embodied instructions will variously be referred to as "instructions" or an "application" for short.

As previously mentioned, the UE 102 may communicate with other devices by using a base station, such as base station 104. In embodiments, base station 104 is a wireless communications station that is installed at a fixed location, such as at a radio tower, as illustrated in FIG. 1. The radio tower may be a tall structure designed to support one or more antennas 106 for telecommunications and/or broadcasting. In other embodiments, base station 104 is a mobile base station. The base station 104 may be an MMU and include gNodeB for mMIMO/5G communications via network 122. In this way, the base station 104 can facilitate wireless communication between UE 102 and network 122.

As stated, the base station 104 may include a radio (not shown) or a remote radio head (RRH) that generally communicates with one or more antennas associated with the base station 104. In this regard, the radio is used to transmit signals or data to an antenna 106 associated with the base station 104 and receive signals or data from the antenna 106. Communications between the radio and the antenna 106 can occur using any number of physical paths. A physical path, as used herein, refers to a path used for transmitting signals or data. As such, a physical path may be referred to as a radio frequency (RF) path, a coaxial cable path, cable path, or the like.

The antenna 106 is used for telecommunications. Generally, the antenna 106 may be an electrical device that converts electric power into radio waves and converts radio waves into electric power. The antenna 106 is typically positioned at or near the top of the radio tower as illustrated in FIG. 1. Such an installation location, however, is not intended to limit the scope of embodiments of the present invention. The radio associated with the base station 104 may include at least one transceiver configured to receive and transmit signals or data.

Continuing, the network environment 100 may further include an Paging Engine 108. The Paging Engine 108 may be configured to, among other things, providing radio base station performance measurements with enhanced granularity, in accordance with the present disclosure. Though Paging Engine 108 is illustrated as a component of base station 104 in FIG. 1, it may be a standalone device (e.g., a server having one or more processors), a component of the UE 102, a service provided via the network 122, or may be remotely located.

Figure 2:
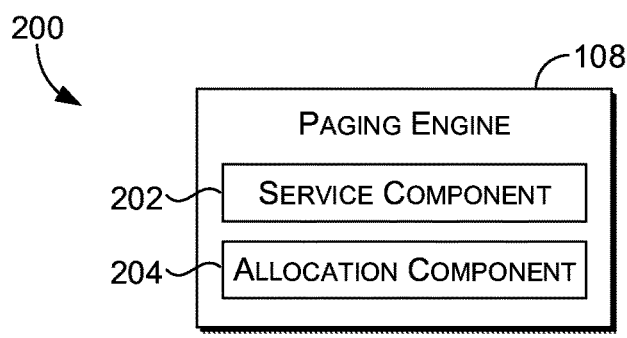
FIG. 2 illustrates an exemplary paging engine, in accordance with aspects herein.

Referring now to FIG. 2, the Paging Engine 108 may include, among other things, service component 202 and allocation component 204. The Paging Engine 108 may receive, among other things, data from user devices, such as UE 102, within a network cell associated with a particular base station 104. For example, the Paging Engine 108 may receive, among other things, RRC messages from UEs, such as UE 102. For clarity, RRC is a layer 3 protocol used between UEs and base stations. The RRC protocol is specified by 3rd Generation Partnership Project (3GPP) in Technical Specification (TS) 25.331 for Universal Mobile Telecommunications System (UMTS), in TS 36.331 for Long-Term Evolution (LTE), and in TS 38.331 for 5G New Radio. RRC messages are transported via the Packet Data Convergence Protocol (PDCP).

RRC messages can be leveraged to provide various functions, including connection establishment and release, broadcast of system information, radio bearer establishment, reconfiguration and release, RRC connection mobility procedures, and paging notification and release. The operation of the RRC is guided by a state machine that defines states of the UE. For example, based on the various states of the state machine, different radio resources are allocated to the UE when in a specific state. Consequently, the state machine may influence the quality of the service the user experiences as well as the energy consumed by the UE.

In aspects, the Paging Engine 108 enables one or more new fields to be created in an RRC message. In various aspects, the Paging Engine 108 may further enable the new fields to be defined at the gNodeB and/or the UE (such as by the manufacturer of the gNodeB and/or the UE). As such, during normal RRC messaging flow between the gNodeB and the UE, the gNodeB and the UE are able to understand the information provided in the new fields. For example, the Paging Engine 108 may enable a service indication flag corresponding to the service type causing the UE to be paged to be created and defined at the gNodeB and/or the UE. Accordingly, data communicated in these new fields may be understood by both the gNodeB and the UE.

In a similar fashion, the service type may be received by the MME from the PGW or by the AMF from the SMF. The Paging Engine 108 enables the MME to set and communicate the service indication flag based on the received service type in an S1-AP message communicated to the node. In other aspects, the Paging Engine 108 enables the AMF to set and communicate the service indication flag based on the received service type in an NGAP message communicated to the node.

For clarity, S1-AP protocol is specified by 3rd Generation Partnership Project (3GPP) in Technical Specification (TS) 36.413 and provides the control-plane signaling between the MME and the base station. NGAP is specified by 3rd Generation Partnership Project (3GPP) in Technical Specification (TS) 38.413 and provides the control-plane signaling between the AMF and the base station.

Receiving component 202 generally receives a service indication flag. The service indication flag may be received from a RRC message from a UE. Additionally or alternatively, the service indication flag may be received in a S1-AP message from the MME. Additionally or alternatively, the service indication flag may be received in a NGAP message from an AMF. In some aspects, the service type that is utilized to set the service indication flag is received by the MME from a PGW. In other aspects, the service type that is utilized to set the service indication flag is received by the AMF from an SMF.

Associating component 204 generally determines, based on the service indication flag, a service type of the terminating service that is causing the UE to be paged. In some aspects, the associating component 204 applies a weight for the service type for the UE. Based on the weight for the service type, resources may be allocated for the UE. In some aspects, the resources comprise time and frequency for communicating paging requests to the UE. In other aspects, the resources correspond to 4G or 5G services for the service type for the UE. The weight may be configurable by a user and/or an operator associated with the node.

Figure 3:
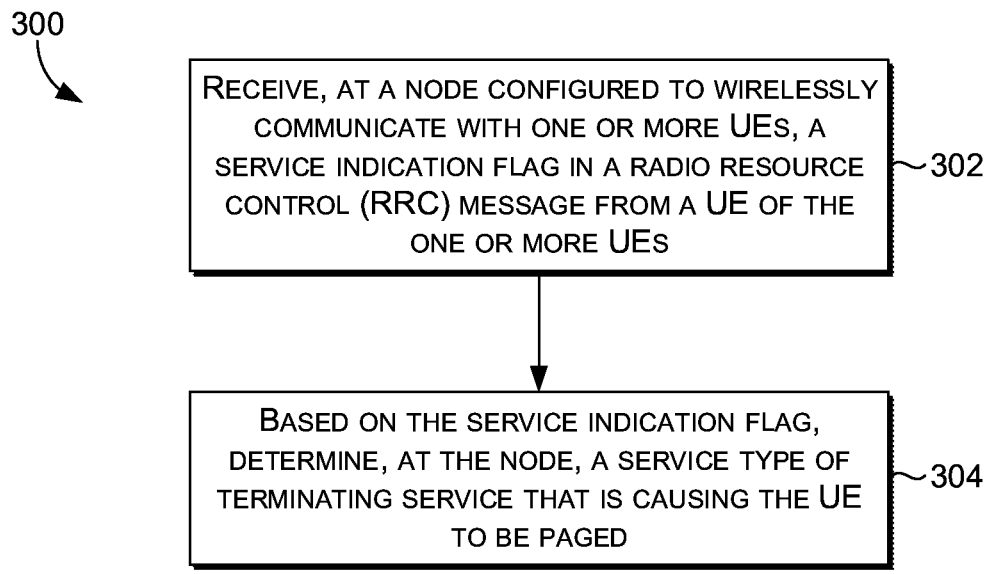
FIG. 3 depicts a flow diagram of a method for communicating service type in a paging message for 4G/5G cellular communications, in accordance with aspects herein.

Turning to FIG. 3, a flow diagram is provided depicting a method 300 for communicating service type in a paging message for 4G/5G cellular communications, according to aspects of the technology described herein. Initially, at step 302, a service indication flag is received at a node configured to wirelessly communicate with one or more UEs in a RRC message from a UE of the one or more UEs.

At step 304, a service type of a terminating service that is causing the UE to be paged is determined at the node, based on the service indication flag. For example, the service type may be IP Multimedia System (IMS) or data. For clarity, IMS includes voice call and messaging, while data includes nearly all other traffic. Knowledge of the service type at the node level enables both the UE and the base station to make choices (such as by allocating resources in accordance with a weight for the service type) to ensure better service level for each user.

In some aspects, the service indication flag is also communicated by the node in a S1-AP message from a MME. The MME receives the service type from a PGW. Additionally or alternatively, the service indication flag is also communicated by the node in a NGAP message from an AMF. The AMF receives the service type from a SMF. In each aspect, there is clear collaboration among each component (e.g., UE, gNodeB/eNodeB, AMF/MME) to ensure underlying components like the UE and the node are fully aware of the service type.

Figure 4:
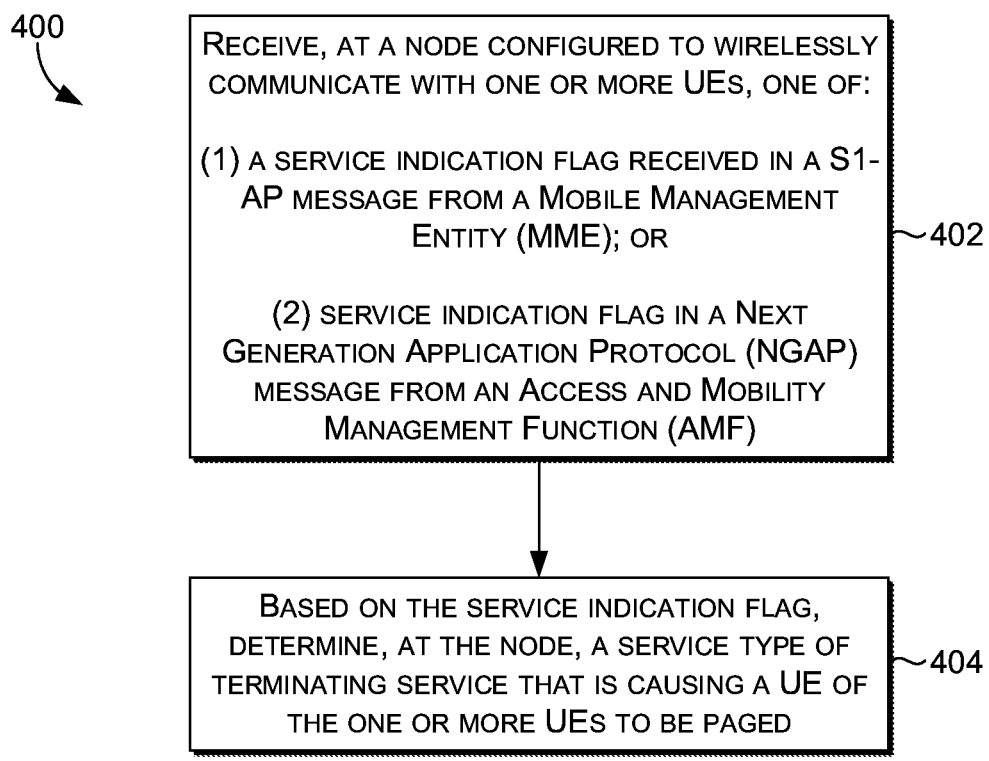
FIG. 4 depicts a flow diagram of a method for communicating service type in a paging message for 4G/5G cellular communications, in accordance with aspects herein.

Referring to FIG. 4, a flow diagram is provided depicting a method 400 for communicating service type in a paging message for 4G/5G cellular communications, according to aspects of the technology described herein. Initially, at step 402, a service indication flag is received at a node configured to wirelessly communicate with one or more UEs in a S1-AP message from a MME or a NGAP message from an AMF. In some aspects, the service type is received by the MME from a PGW enabling the MME to set the service indication flag in the S1-AP message. In other aspects, the service type is received by the AMF from a SMF enabling the AMF to set the service indication flag in the NGAP message.

At step 404, a service type of a terminating service that is causing a UE of the one or more UEs to be paged is determined at the node. In some aspects, the service indication flag is also received at the node in a RRC message from the UE of the one or more UEs. In each aspect, there is clear collaboration among each component (e.g., UE, gNodeB/eNodeB, AMF/MME) to ensure underlying components like the UE and the node are fully aware of the service type.

Figure 5:
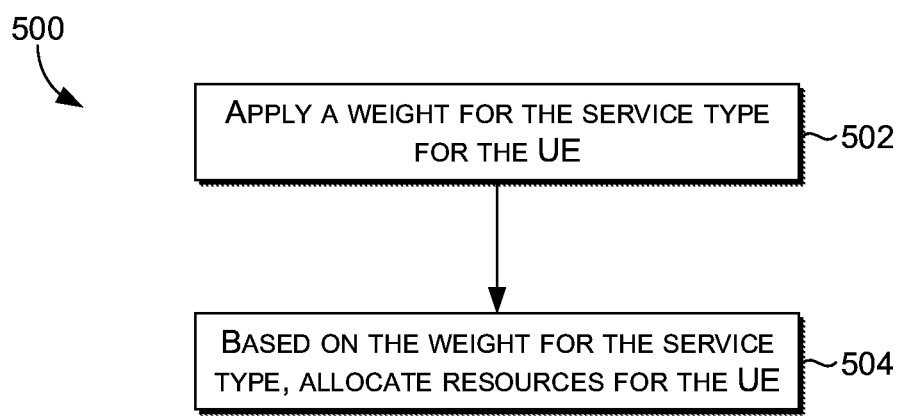
FIG. 5 depicts a flow diagram of a method for allocating resources for a UE based on an applied weight for a service type determined in a paging message for 4G/5G cellular communications, in accordance with aspects herein.

In FIG. 5, a flow diagram is provided depicting a method 500 for allocating resources for a UE based on an applied weight for a service type determined in a paging message for 4G/5G cellular communications, according to aspects of the technology described herein. Initially, at step 502, a weight may be applied for the service type for the UE. In some aspects, the weight is configurable by a user. Additionally or alternatively, the weight is configurable by an operator associated with the node.

At step 504, based on the weight for the service type, resources may be allocated for the UE. In some aspects, the resources comprise time and frequency for communicating paging requests to the UE. For example, in an emergency situation, a higher than normal number of users may be receiving voice calls from loved ones checking in on their status. In this case, more resources should be reserved for voice paging. Accordingly, a greater weight may be applied to voice paging resulting in the frequency of voice paging to be increased without regard for time.

In another example, during the middle of the night under ordinary circumstances, it may not be necessary to page for voice or data at all if a user does not wish to be disturbed. Accordingly, a significantly lower weight can be applied to voice and data paging resulting in the frequency of voice and data paging to be reduced during the specified time period. As can be appreciated, in extraordinary circumstances such as the emergency situation described above, a greater weight may be applied even during the middle of the night to ensure the frequency of voice and data paging is increased.

In some aspects, the resources comprise the resources correspond to 4G or 5G services for the service type for the UE. For example, a user may be awaiting a very important phone call. In this scenario, the user may not want limit any 4G or 5G services that may interfere with receiving the phone call in a timely manner or cause any resources of the UE to be over utilized (e.g., battery). Accordingly, voice may be allocated with higher emphasis in the corresponding 4G or 5G network (and by the UE itself). Similarly, if the user is expecting a very important piece of data, the user may not want to limit any 4G or 5G services that may interfere with receiving the data in a timely manner or cause any resources of the UE to be over utilized (e.g., battery). In this situation, data may be allocated with higher emphasis in the corresponding 4G or 5G network (and by the UE itself).

Embodiments of the technology described herein may be embodied as, among other things, a method, a system, or a computer-program product. Accordingly, the embodiments may take the form of a hardware embodiment, or an embodiment combining software and hardware. The present technology may take the form of a computer-program product that includes computer-useable instructions embodied on one or more computer-readable media. The present technology may further be implemented as hard-coded into the mechanical design of network components and/or may be built into a broadcast cell or central server.

Computer-readable media includes both volatile and non-volatile, removable and non-removable media, and contemplate media readable by a database, a switch, and/or various other network devices. Network switches, routers, and related components are conventional in nature, as are methods of communicating with the same. By way of example, and not limitation, computer-readable media may comprise computer storage media and/or non-transitory communications media.

Computer storage media, or machine-readable media, may include media implemented in any method or technology for storing information. Examples of stored information include computer-useable instructions, data structures, program modules, and other data representations. Computer storage media may include, but are not limited to, RAM, ROM, EEPROM, flash memory or other memory technology, CD-ROM, digital versatile discs (DVD), holographic media or other optical disc storage, magnetic cassettes, magnetic tape, magnetic disk storage, and/or other magnetic storage devices. These memory components may store data momentarily, temporarily, and/or permanently, and are not limited to the examples provided.

Communications media typically store computer-useable instructions—including data structures and program modules—in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

Referring to FIG. 6, a block diagram of an exemplary computing device 600 suitable for use in implementations of the technology described herein is provided. In particular, the exemplary computer environment is shown and designated generally as computing device 600. Computing device 600 is but one example of a suitable computing environment and is not intended to suggest any limitation as to the scope of use or functionality of the invention. Neither should computing device 600 be interpreted as having any dependency or requirement relating to any one or combination of components illustrated. It should be noted that although some components in FIG. 6 are shown in the singular, they may be plural. For example, the computing device 600 might include multiple processors or multiple radios. In aspects, the computing device 600 may be a UE/WCD, or other user device, capable of two-way wireless communications with an access point. Some non-limiting examples of the computing device 600 include a cell phone, tablet, pager, personal electronic device, wearable electronic device, activity tracker, desktop computer, laptop, PC, and the like.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

As shown in FIG. 6, computing device 600 includes a bus 610 that directly or indirectly couples various components together, including memory 612, processor(s) 614, presentation component(s) 616 (if applicable), radio(s) 624, input/output (I/O) port(s) 618, input/output (I/O) component(s) 620, and power supply(s) 622. Although the components of FIG. 6 are shown with lines for the sake of clarity, in reality, delineating various components is not so clear, and metaphorically, the lines would more accurately be grey and fuzzy. For example, one may consider a presentation component such as a display device to be one of I/O components 620. Also, processors, such as one or more processors 614, have memory. The present disclosure hereof recognizes that such is the nature of the art, and reiterates that FIG. 6 is merely illustrative of an exemplary computing environment that can be used in connection with one or more implementations of the present disclosure. Distinction is not made between such categories as "workstation," "server," "laptop," "handheld device," etc., as all are contemplated within the scope of the present disclosure and refer to "computer" or "computing device."

Memory 612 may take the form of memory components described herein. Thus, further elaboration will not be provided here, but it should be noted that memory 612 may include any type of tangible medium that is capable of storing information, such as a database. A database may be any collection of records, data, and/or information. In one embodiment, memory 612 may include a set of embodied computer-executable instructions that, when executed, facilitate various functions or elements disclosed herein. These embodied instructions will variously be referred to as "instructions" or an "application" for short.

Processor 614 may actually be multiple processors that receive instructions and process them accordingly. Presentation component 616 may include a display, a speaker, and/or other components that may present information (e.g., a display, a screen, a lamp (LED), a graphical user interface (GUI), and/or even lighted keyboards) through visual, auditory, and/or other tactile cues.

Radio 624 represents a radio that facilitates communication with a wireless telecommunications network. Illustrative wireless telecommunications technologies include CDMA, GPRS, TDMA, GSM, and the like. Radio 624 might additionally or alternatively facilitate other types of wireless communications including Wi-Fi, WiMAX, LTE, 3G, 4G, LTE, mMIMO/5G, NR, VoLTE, or other VoIP communications. As can be appreciated, in various embodiments, radio 624 can be configured to support multiple technologies and/or multiple radios can be utilized to support multiple technologies. A wireless telecommunications network might include an array of devices, which are not shown so as to not obscure more relevant aspects of the invention. Components such as a base station, a communications tower, or even access points (as well as other components) can provide wireless connectivity in some embodiments.

The input/output (I/O) ports 618 may take a variety of forms. Exemplary I/O ports may include a USB jack, a stereo jack, an infrared port, a firewire port, other proprietary communications ports, and the like. Input/output (I/O) components 620 may comprise keyboards, microphones, speakers, touchscreens, and/or any other item usable to directly or indirectly input data into the computing device 600.

Power supply 622 may include batteries, fuel cells, and/or any other component that may act as a power source to supply power to the computing device 600 or to other network components, including through one or more electrical connections or couplings. Power supply 622 may be configured to selectively supply power to different components independently and/or concurrently.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. A method for communicating service type in a paging message for 4G/5G cellular communications, the method comprising:
enabling a service indication flag to be created in a radio resource control (RRC) message, the service indication flag defined by a UE and corresponding to a service type of a terminating service causing the UE to be paged;
receiving, at a node configured to wirelessly communicate with one or more UEs, the service indication flag;
based on the service indication flag, determining, at the node, the service type of the terminating service that is causing the UE of the one or more UEs to be paged; and
based on the service type, allocating resources for the UE, wherein the resources comprise time and frequency for communicating paging requests to the UE.

2. The method of claim 1, further comprising receiving, at the node, the service indication flag in the message from a UE of the one or more UEs and in a S1-AP message from a Mobile Management Entity (MME).

3. The method of claim 2, wherein the service type is received by the MME from a Packet Data Network Gateway (PGW) causing the service indication flag to be set.

4. The method of claim 1, further comprising receiving, at the node, the service indication flag in the message from a UE of the one or more UEs and in a Next Generation Application Protocol (NGAP) message from an Access and Mobility Management Function (AMF).

5. The method of claim 4, wherein the service type is received by the AMF from a Session Management Function (SMF) causing the service indication flag to be set.

6. The method of claim 1, further comprising applying a weight for the service type for the UE.

7. The method of claim 6, wherein the resources allocated for the UE are further based on the weight for the service type.

8. The method of claim 7, wherein the resources correspond to 4G or 5G services for the service type for the UE.

9. The method of claim 6, wherein the weight is configurable by a user.

10. The method of claim 6, wherein the weight is configurable by an operator associated with the node.

11. A method for communicating service type in a paging message for 4G/5G cellular communications, the method comprising:
receiving, at a node configured to wirelessly communicate with one or more UEs;
a service indication flag created in a radio resource control (RRC) message and defined by a UE of the one or more UEs corresponding to a service type of a terminating service causing the UE to be paged;

based on the service indication flag, determining, at the node, the service type of the terminating service that is causing the UE of the one or more UEs to be paged; and based on the service type, allocating resources for the UE, wherein the resources comprise time and frequency for communicating paging requests to the UE.

12. The method of claim 11, wherein the service type is received by the MME from a Packet Data Network Gateway (PGW) causing the service indication flag to be set.

13. The method of claim 11, wherein the service type is received by the AMF from a Session Management Function (SMF) causing the service indication flag to be set.

14. The method of claim 11, further comprising receiving, at the node, confirmation of the service indication flag in the message from the UE of the one or more UEs.

15. The method of claim 11, further comprising applying a weight for the service type for the UE.

16. The method of claim 15, wherein the resources further comprise
4G or 5G services for the service type for the UE.

17. A system for communicating service type in a paging message for 4G/5G cellular communications, the system comprising:

one or more UEs; and a node configured to wirelessly communicate with the one or more UEs, wherein the node is configured to:

(1) receive a service indication flag in
a radio resource control (RRC) message from a UE of the one or more UEs, the service indication flag created and defined by a UE and corresponding to a service type of a terminating service causing the UE to be paged;

(2) based on the service indication flag, determine the service type of the terminating service that is causing the UE to be paged; and (3) based on the service type, allocate resources for the UE, wherein the resources comprise time and frequency for communicating paging requests to the UE.

18. The method of claim 17, wherein the resources further correspond to 4G or 5G services for the service type for the UE.

* * * * *